US012804723B2

(12) United States Patent
Ahn et al.

(10) Patent No.: US 12,804,723 B2
(45) Date of Patent: Nov. 17, 2026

(54) METHOD AND APPARATUS OF INITIAL ACCESS FOR REDUCED CAPABILITY TERMINAL IN WIRELESS COMMUNICATION SYSTEM

(71) Applicant: LG Electronics Inc., Seoul (KR)

(72) Inventors: Seungjin Ahn, Seoul (KR); Youngdae Lee, Seoul (KR); Jaehyung Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 18/717,184

(22) PCT Filed: Apr. 1, 2024

(86) PCT No.: PCT/KR2024/004145

§ 371 (c)(1),
(2) Date: Jun. 6, 2024

(87) PCT Pub. No.: WO2024/210423

PCT Pub. Date: Oct. 10, 2024

(65) Prior Publication Data

US 2026/0164468 A1 Jun. 11, 2026

Related U.S. Application Data

(60) Provisional application No. 63/457,379, filed on Apr. 5, 2023, provisional application No. 63/457,385, filed on Apr. 5, 2023.

(51) Int. Cl.

| | |
|---|---|
| ***H04W 74/0833*** | (2024.01) |
| ***H04W 72/0457*** | (2023.01) |
| ***H04W 72/21*** | (2023.01) |

(52) U.S. Cl.
CPC ... *H04W 74/0833* (2013.01); *H04W 72/0457* (2023.01); *H04W 72/21* (2023.01)

(58) Field of Classification Search
CPC ......... H04W 74/0833; H04W 72/0457; H04W 72/21
See application file for complete search history.

(56) References Cited

U.S. PATENT DOCUMENTS

2023/0276388 A1* 8/2023 Hu .......................... H04W 8/22
2025/0168888 A1* 5/2025 Futaki ................... H04W 24/02

FOREIGN PATENT DOCUMENTS

JP 2023-520545 A 5/2023
WO 2021/197404 A1 10/2021

OTHER PUBLICATIONS

CATT, "Views on remaining issues of RedCap," R1-2109234, 3GPP TSG RAN WG1, #106bis-e, e-Meeting, Oct. 11-19, 2021, 3 pages.

(Continued)

*Primary Examiner* — Elton Williams
(74) *Attorney, Agent, or Firm* — Fish & Richardson P.C.

(57) ABSTRACT

A method performed by a terminal in a wireless communication system according to an embodiment of the present disclosure may include receiving, from a network, information on at least one feature combination, and information on at least one random access (RA) resource set associated with the at least one feature combination; and based on one RA resource set of the at least one RA resource set, transmitting a first message of a random access procedure to the network. Based on a first feature combination being associated with a first RA resource set and a second feature combination being associated with a second RA resource set: the first feature combination may include a first reduced capability feature, the second feature combination may include a second reduced capability feature, and both the first reduced capability feature and the second reduced capability feature may not be included in one feature combination.

17 Claims, 8 Drawing Sheets

(56) References Cited

OTHER PUBLICATIONS

Ericsson, "FL summary #4 on Rel-18 RedCap UE complexity reduction," R1-2301889, 3GPP TSG-RAN WG1, Meeting #112, Athens, Greece, Feb. 27-Mar. 3, 2023, 22 pages.
Ericsson, "RACH partitioning for Rel-17 features," R2-2201553, 3GPP TSG-RAN WG2, #116bis, Electronic meeting, Jan. 17-25, 2022, 8 pages.
International Search Report in International Appln. No. PCT/KR2024/004145, mailed on Jul. 15, 2024, 2 pages.
Samsung, "Further UE complexity reduction for eRedCap," R1-2301275, 3GPP TSG RAN WG1, #112, Athens, Greece, Feb. 27-Mar. 3, 2023, 4 pages.
ZTE, "Early indication for eRedCap UE," R2-2301059, 3GPP TSG-RAN WG2, Meeting #121, Athens, Greece, Feb. 27-Mar. 3, 2023, 3 pages.
3GPP, "3rd Generation Partnership Project; Technical Specification Group Radio Access Network; NR; Radio Resources Control (RRC) protocol specification (Release 17)," 3GPP TS 38.331 V17.4.0, Mar. 2023, 15 pages.
LG Electronics, "Discussion on early indication for Rel-18 RedCap UE," R2-2301726, 3GPP TSG-RAN WG2 Meeting #121, Athens, Greece, Feb. 27-Mar. 3, 2023, 4 pages.
Office Action in Japanese Appln. No. 2025-540090, mailed on Jun. 16, 2026, 16 pages (with English translation).

* cited by examiner

METHOD AND APPARATUS OF INITIAL ACCESS FOR REDUCED CAPABILITY TERMINAL IN WIRELESS COMMUNICATION SYSTEM

CROSS-REFERENCE TO RELATED APPLICATIONS

This application is a National Stage application under 35 U.S.C. § 371 of International Application No. PCT/KR2024/004145, filed on Apr. 1, 2024, which claims the benefit of U.S. Provisional Application No. 63/457,379, filed on Apr. 5, 2023, and 63/457,385, filed on Apr. 5, 2023. The disclosures of the prior applications are incorporated by reference in their entirety.

TECHNICAL FIELD

The present disclosure relates to a wireless communication system, and more particularly, to an initial access method and apparatus for a reduced capability terminal in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

Disclosure

A technical object of the present disclosure is to provide an initial access method and apparatus for various reduced capability terminals in a wireless communication system.

An additional technical object of the present disclosure is to provide an early feature indication method and apparatus based on a random access-related resource of various reduced capability terminals in a wireless communication system.

An additional technical object of the present disclosure is to provide a method and an apparatus for a bandwidth part configuration for various reduced capability terminals and initial access based thereon in a wireless communication system The technical objects to be achieved by the present disclosure are not limited to the above-described technical objects, and other technical objects which are not described herein will be clearly understood by those skilled in the pertinent art from the following description.

A method performed by a terminal in a wireless communication system according to an aspect of the present disclosure may include receiving from a network information on at least one feature combination, and information on at least one random access (RA) resource set associated with the at least one feature combination; and based on one RA resource set of the at least one RA resource set, transmitting a first message of a random access procedure to the network. Based on a first feature combination being associated with a first RA resource set and a second feature combination being associated with a second RA resource set, the first feature combination may include a first reduced capability feature, the second feature combination may include a second reduced capability feature, and both the first reduced capability feature and the second reduced capability feature may not be included in one feature combination.

A method performed by a base station in a wireless communication system according to an additional aspect of the present disclosure may include transmitting to at least one terminal information on at least one feature combination, and information on at least one random access (RA) resource set associated with the at least one feature combination; and receiving from a terminal a first message of a random access procedure transmitted based on one RA resource set of the at least one RA resource set. Based on a first feature combination being associated with a first RA resource set and a second feature combination being associated with a second RA resource set, the first feature combination may include a first reduced capability feature, the second feature combination may include a second reduced capability feature, and both the first reduced capability feature and the second reduced capability feature may not be included in one feature combination.

According to the present disclosure, an initial access method and apparatus for various reduced capability terminals in a wireless communication system may be provided.

According to the present disclosure, an early feature indication method and apparatus based on a random access-related resource of various reduced capability terminals in a wireless communication system may be provided.

According to the present disclosure, a method and an apparatus for a bandwidth part configuration for various reduced capability terminals and initial access based thereon in a wireless communication system may be provided.

Effects achievable by the present disclosure are not limited to the above-described effects, and other effects which are not described herein may be clearly understood by those skilled in the pertinent art from the following description.

BRIEF DESCRIPTION OF DRAWINGS

Accompanying drawings included as part of detailed description for understanding the present disclosure provide embodiments of the present disclosure and describe technical features of the present disclosure with detailed description.

DETAILED DESCRIPTION

Figure 1:
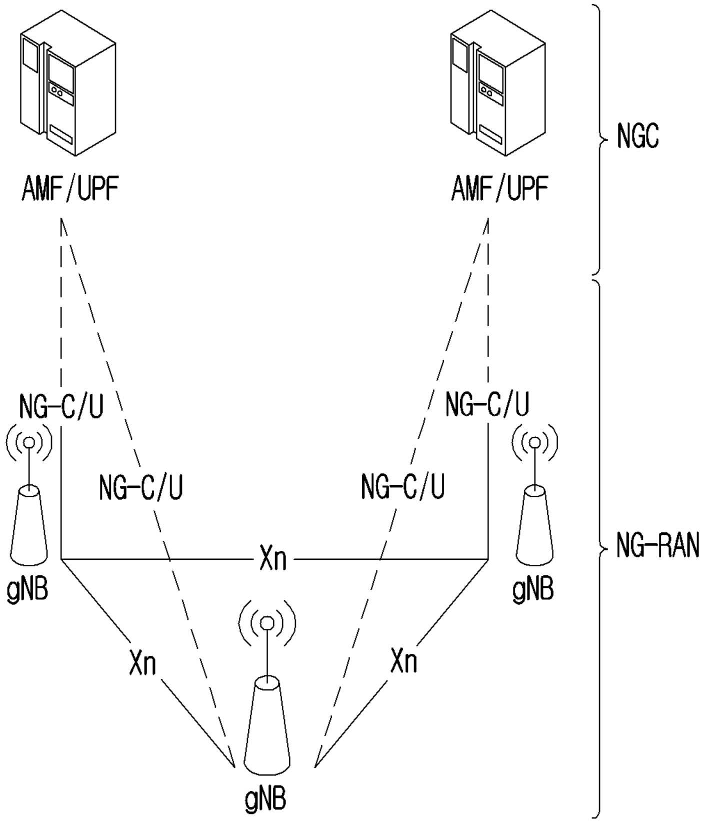
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being “connected”, “combined” or “linked” to another element, it may include an indirect connection relation that yet another element presents therebetween as well as a direct connection relation. In addition, in the present disclosure, a term, “include” or “have”, specifies the presence of a mentioned feature, step, operation, component and/or element, but it does not exclude the presence or addition of one or more other features, stages, operations, components, elements and/or their groups.

In the present disclosure, a term such as “first”, “second”, etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, “and/or”, may refer to one of related enumerated items or it means that it refers to and includes any and all possible combinations of two or more of them. In addition, “/” between words in the present disclosure has the same meaning as “and/or”, unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. “xxx” means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
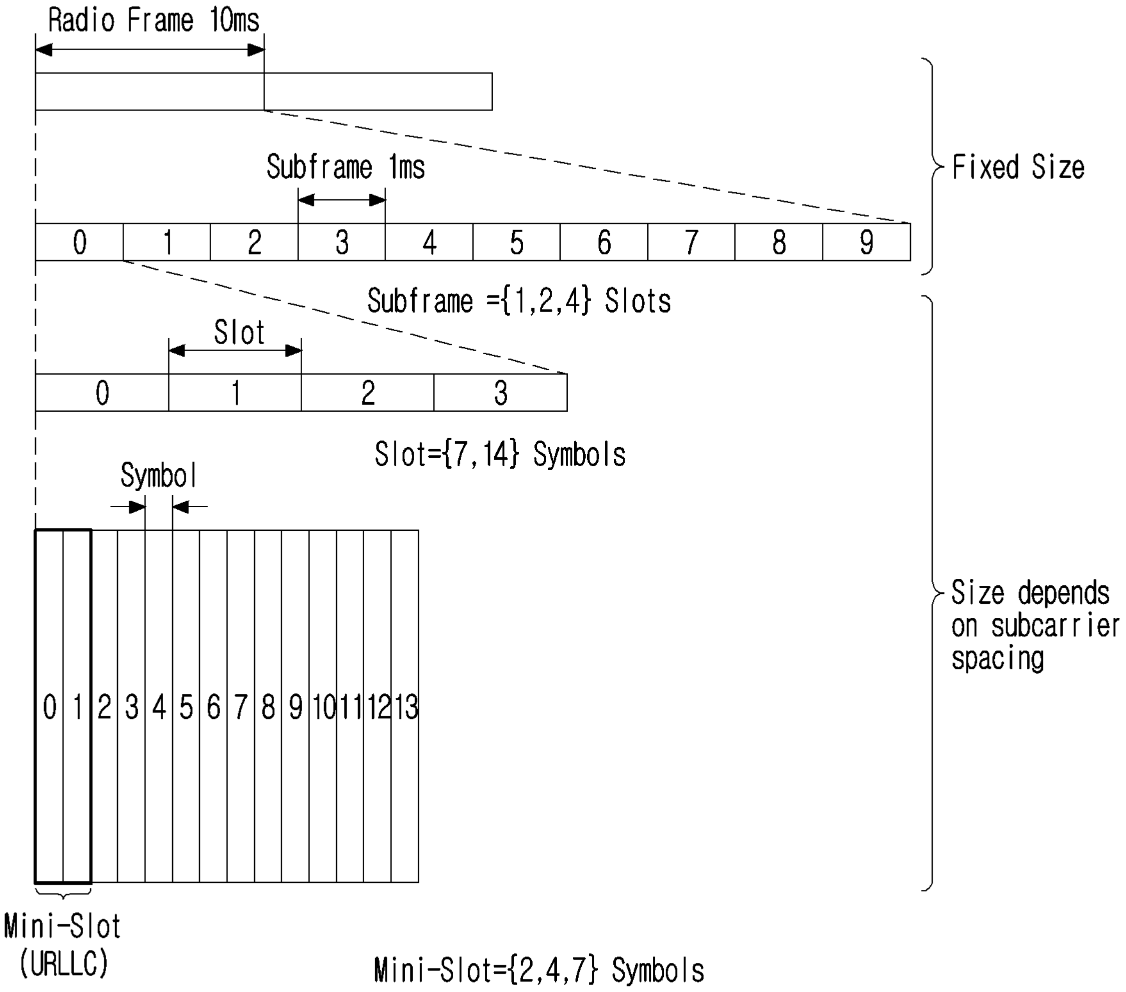
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an system, a size of a variety of fields in a time domain is expresses as a multiple of a time unit of $T_c=1/(\Delta f_{max}\cdot N_f)$. Here, $\Delta f_{max}$ is $480\cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration, slots are numbered in an increasing order of $n_s^{\mu}\in\{0, \ldots, N_{slot}^{subframe,\mu}-1\}$ in a subframe and are numbered in an increasing order of $n_{s,f}^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
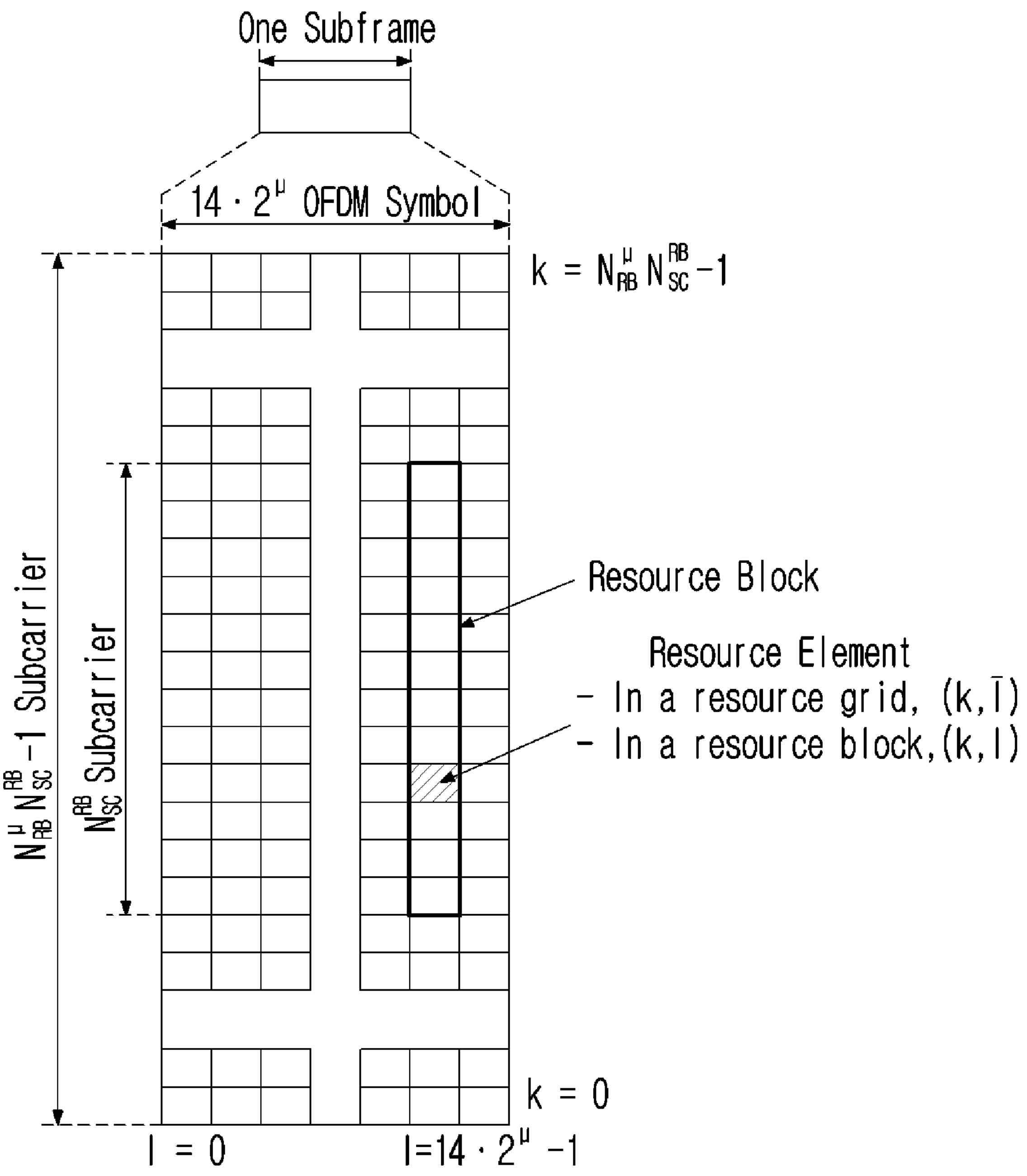
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}N_{sc}^{RB}$ subcarriers in a frequency domain and one subframe is configured with $14\cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu}\leq N_{RB}^{max,\mu}$. The $N_{RB}^{max,\mu}$ represents a maximum transmission bandwidth, which may be different between an uplink and a downlink as well as between numerologies. In this case, one resource grid may be configured per and antenna port p. Each element of a resource grid for $\mu$ and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for and an antenna port p corresponds to a complex value, $a_{k,l'}^{(p,\mu)}$. When there is no risk of confusion or when a specific antenna port or numerology is not specified, indexes p and $\mu$ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration. The center of subcarrier 0 of common resource block 0 for a subcarrier spacing configuration is identical to 'point A'. A relationship between a common resource block number $n_{CRB}^{\mu}$ and a resource element (k,l) for a subcarrier spacing configuration in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
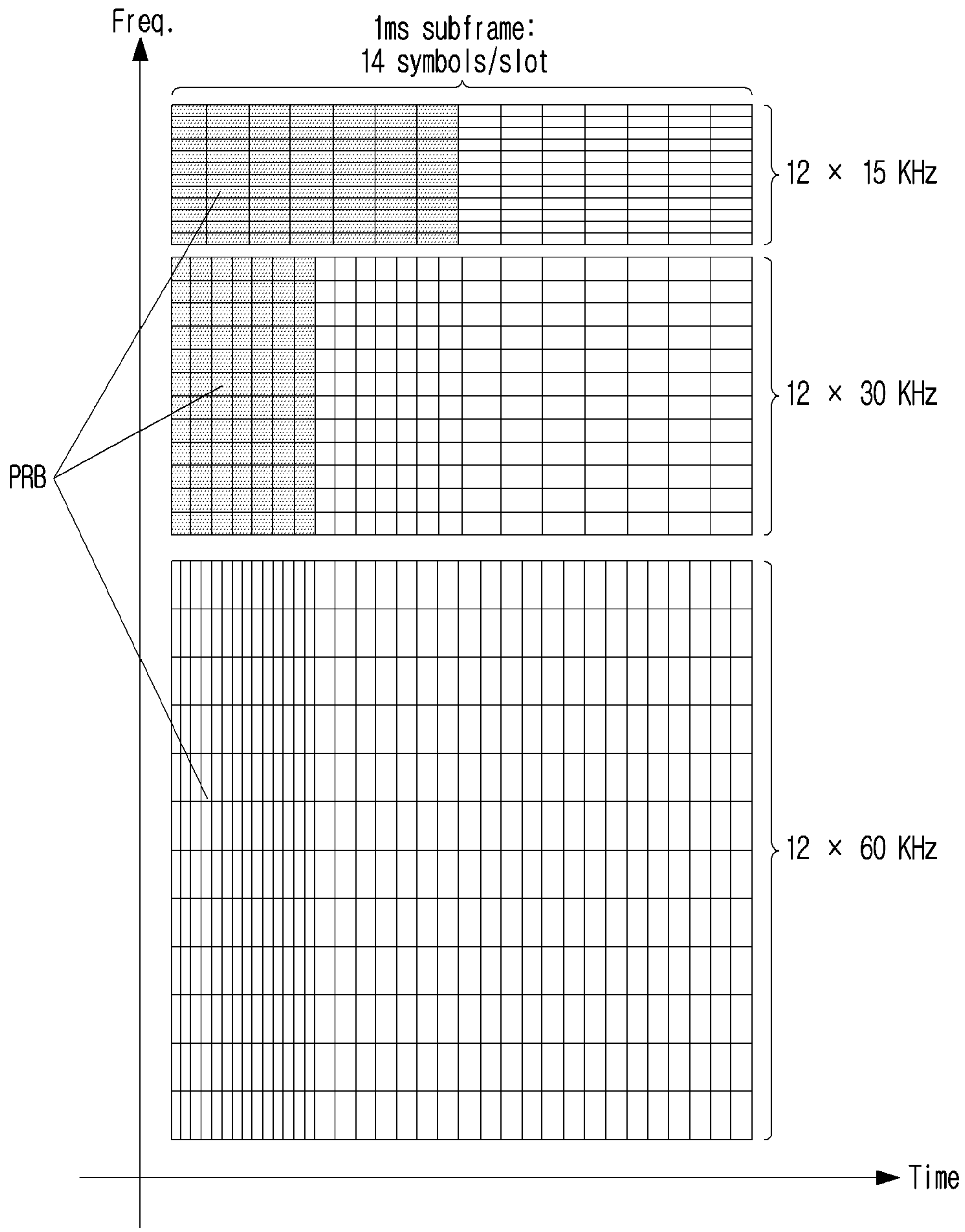
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
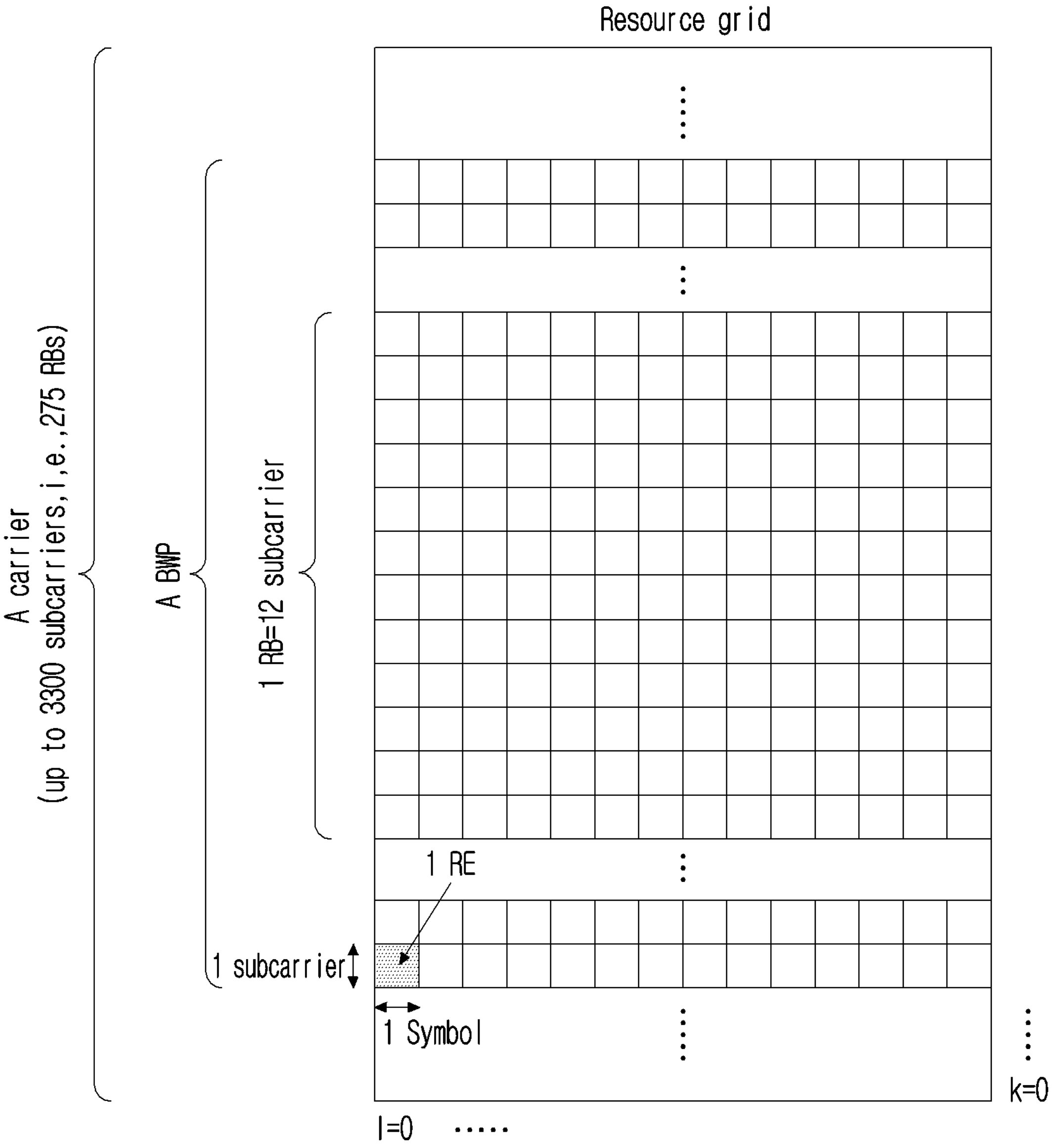
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
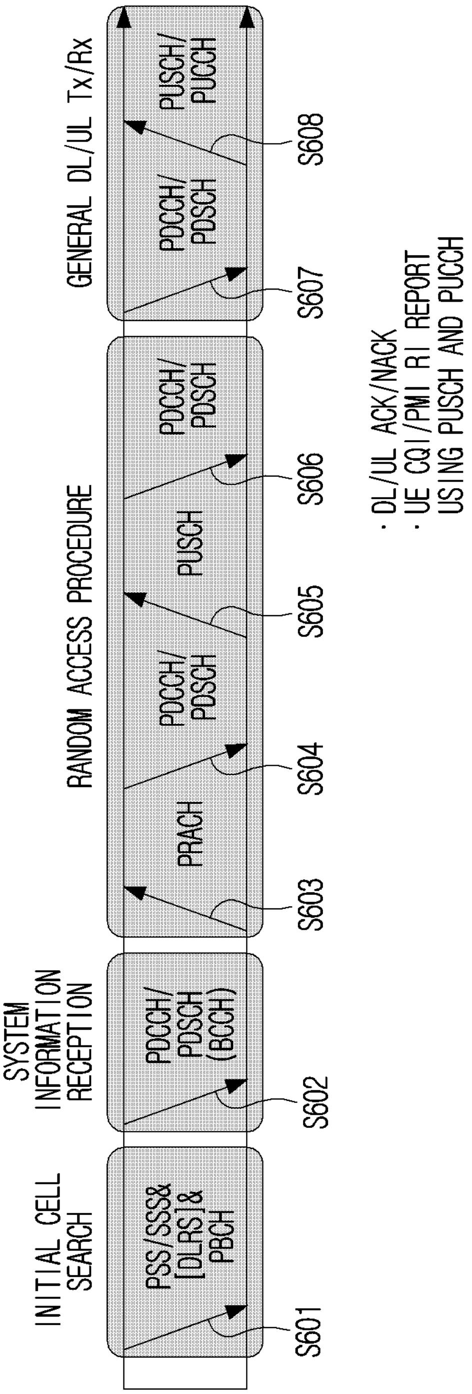
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Initial Access of Various Reduced Capability Terminals

In order to support a device that satisfies low power, low cost and low latency suitable for a smart factory, a wearable device, etc. in the existing wireless communication system, a reduced capability (RedCap) terminal is defined. In addition, supporting an enhanced reduced capability (eRedCap) terminal is being discussed. For example, a RedCap terminal supports a peak data rate of 50 Mbps, and an eRedCap terminal may correspond to a lower performance terminal type that supports a peak data rate of 10 Mbps. In a wireless communication system where a high-performance (or non-RedCap) terminal such as the existing smart phone, the existing RedCap terminal and a newly defined eRedCap terminal are mixed, a new method for efficiently performing initial access of a terminal is required.

For example, in order to transmit or receive unicast data between a terminal and a network (or a base station) after a terminal establishes a connection through initial access, a suitable random access procedure and scheduling method needs to be defined per various types of terminals (or a group/a combination of supported capabilities/features). In addition, an early indication method is required to allow a network to know a terminal type (or a group/a combination of supported capabilities/features) before a terminal reports its specific capability information to a network.

The various types of terminals assumed in the present disclosure may include RedCap, eRedCap, a general terminal, etc. Furthermore, an eRedCap terminal may be classified as an eRedCap terminal that supports the maximum bandwidth of 20 MHz (i.e., does not support a reduced bandwidth), or an eRedCap terminal that supports the maximum bandwidth of less than 20 MHz (e.g., 5 MHz) (i.e., supports a reduced bandwidth) (additionally, an eRedCap terminal with different performance, etc.). For example, for a reduced capability (e.g., (e)RedCap) terminal that may operate only in a narrow bandwidth, there may be a limit on decoding performance or an usable bandwidth size, etc. compared to a high-performance terminal such as a smart phone. Before a terminal provides information about its capability and/or function to a network through terminal capability reporting, a network may perform scheduling for a terminal by assuming the minimum performance. There is also a need to improve a method to early indicate a terminal type (a group/a combination of supported capabilities/features) and support a network to detect it through an initial access process such as a terminal's random access procedure, etc. before terminal capability reporting.

Figure 7:
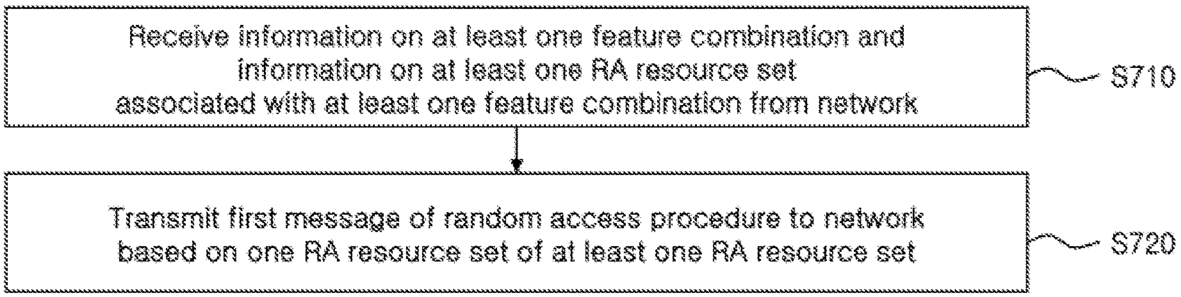
FIG. 7 is a diagram for describing an example of an operation of a terminal according to the present disclosure.

FIG. 7 is a diagram for describing an example of an operation of a terminal according to the present disclosure.

In S710, a terminal may receive information about at least one feature combination, and information about at least one random access (RA) resource set associated with at least one feature combination from a network.

For example, one feature combination may correspond to a combination of at least one field/feature among various fields (i.e., features) such as RedCap, eRedCap, smallData (transmission of data and/or signaling in a RRC inactive state), nsag (network slice AS group), msg3-repetition (repetitive transmission of a third message of a random access procedure), etc. In other words, in information configuring a feature combination, a feature included in any feature combination may be configured as true (or may exist within feature combination configuration information), and other features that are not included in a corresponding feature combination may not be configured as true (or may not exist within feature combination configuration information). A different feature combination may include a different field/feature.

In some examples of the present disclosure, both an eRedCap feature (or a first reduced capability feature) and a RedCap feature (or a second reduced capability feature) may not be included in one feature combination. In other words, if an eRedCap feature is included in one feature combination, a RedCap feature may not be included. Alternatively, if a RedCap feature is included in one feature combination, an eRedCap feature may not be included. Alternatively, one feature combination may include neither a RedCap feature nor an eRedCap feature.

In some examples of the present disclosure, one feature combination (or feature group or capability set) may be associated with one RA resource set. A RA resource set may correspond to a set of preambles used in a random access procedure. For example, preambles for a feature combination may be defined by a start preamble, the number of preambles, etc.

For example, a first feature combination may include an eRedCap feature (or a first reduced capability feature). A first feature combination may be associated with a first RA set. A second feature combination may include a RedCap feature (or a second reduced capability feature). A second RA set may be associated with a second feature combination. Information about a feature combination and a RA resource set associated therewith may include both of a first feature combination and a first RA set, and a second feature combination and a second RA set, or only one of them.

Information about at least one feature combination and information about at least one RA resource set associated with at least one feature combination may be included in a system information block (SIB) and received by a terminal. System information may be commonly provided to multiple (or all) terminals within a cell.

In S720, a terminal may transmit a first message of a random access procedure to a network based on one RA resource set among at least one RA resource set.

In some examples of the present disclosure, when a terminal supports an eRedCap feature (or a first reduced capability feature), one RA resource set used to transmit a first message may be a first RA set (i.e., a preamble set associated with a first feature combination including an eRedCap feature (or a first reduced capability feature)).

In some examples of the present disclosure, an eRedCap feature (or a first reduced capability feature) may be configured in a RA resource set (or a preamble set) that is configured as a 4-level RA type. In other words, an eRedCap terminal may transmit a first message (or Msg1) of a 4-step random access procedure by including a preamble selected from a RA resource set associated with a feature combination including a eRedCap feature. A RedCap feature (or a second reduced capability feature) may be configured in a RA resource set (or a preamble set) configured as a 4-level RA type, or may be configured in a RA resource set (or a preamble set) configured as a 2-level RA type. In other words, a RedCap terminal may transmit a first message (or Msg1) of a 4-step random access procedure or a first message (or MsgA) of a 2-step random access procedure by including a preamble selected from a RA resource set associated with a feature combination including a RedCap feature.

In some examples of the present disclosure, a terminal supports an eRedCap feature (or a first reduced capability feature), but there may be no RA resource set associated with a first feature combination including an eRedCap feature (or a first reduced capability feature) among at least one (or all configured) RA resource set. In this case, one RA resource set used to transmit a first message may be a second RA set (i.e., a preamble set associated with a second feature combination including a RedCap feature (or a second reduced capability feature)).

A terminal may receive a second message (Msg2, or a random access response (RAR)) from a network after transmitting a first message (Msg1 or a PRACH preamble) of a 4-step random access procedure, and subsequently, a terminal may receive a fourth message (Msg4, a contention resolution message) from a network after transmitting a third message (Msg3 or PUSCH data). Alternatively, a terminal may receive a second message (MsgB) from a network after transmitting a first message (MsgA, or PRACH preamble transmission and PUSCH data transmission) of a 2-step random access procedure. PUSCH data transmitted by a terminal through Msg3 of a 4-step random access procedure or MsgA of a 2-step random access procedure may correspond to a message transmitted on an UL-SCH, and a corresponding message may include a common control channel (CCCH) service data unit (SDU).

In some examples of the present disclosure, a logical channel identifier (LCID) for UL-SCH/CCCH may be defined as a value distinguished for a terminal supporting an eRedCap feature (or a first reduced capability feature) and a RedCap feature (or a second reduced capability feature).

In some examples of the present disclosure, an initial uplink (UL) BWP may be commonly or independently configured for a terminal supporting an eRedCap feature (or a first reduced capability feature) and a terminal supporting a RedCap feature (or a second reduced capability feature). A first message (Msg1) and/or a third message (Msg3) of a 4-step random access procedure, or a first message (MsgA) of a 2-step random access procedure may be transmitted on an initial UL BWP.

In some examples of the present disclosure, an initial downlink (DL) BWP may be commonly or independently configured for a terminal supporting an eRedCap feature (or a first reduced capability feature) and a terminal supporting a RedCap feature (or a second reduced capability feature). A second message (Msg2) and/or a fourth message (Msg4) of a 4-step random access procedure, or a second message (MsgB) of a 2-step random access procedure may be received on an initial DL BWP.

In some examples of the present disclosure, an eRedCap feature (or a first reduced capability feature) may be a terminal that supports a reduced bandwidth (e.g., a bandwidth of less than 20 MHz (e.g., 5 MHz) for unicast described below), or a terminal that does not support a reduced bandwidth (e.g., a terminal that supports a 20 MHz bandwidth for unicast). In other words, a terminal with an eRedCap feature (or a first reduced capability feature) may use a common RA resource set and a common LCID without distinguishing between a terminal supporting a reduced bandwidth and a terminal supporting a reduced bandwidth. A terminal that supports a reduced bandwidth of an eRedCap feature (or a first reduced capability feature) and a terminal that does not support a reduced bandwidth may support a peak data rate of 10 Mbps.

A method described in an example of FIG. 7 may be performed by a first device 100 of FIG. 9 described later. For example, at least one processor 102 of a first device 100 in FIG. 9 may be configured to receive information about at least one feature combination and information about at least one RA resource set associated with at least one feature combination from a network through at least one transceiver, and transmit a first message of a random access procedure to a network based on one RA resource set of at least one RA resource set through at least one transceiver. Furthermore, at least one memory 104 of a first device 100 may store instructions for performing a method described in an example of FIG. 7 or examples described below when being executed by at least one processor 102.

For example, one feature combination may correspond to a combination of at least one field/feature among various fields (i.e., features) such as RedCap, eRedCap, smallData (transmission of data and/or signaling in a RRC inactive state), nsag (network slice AS group), msg3-repetition (repetitive transmission of a third message of a random access procedure), etc. In other words, in information configuring a feature combination, a feature included in any feature combination may be configured as true (or may exist within feature combination configuration information), and other features that are not included in a corresponding feature combination may not be configured as true (or may not exist within feature combination configuration information). A different feature combination may include a different field/feature.

In some examples of the present disclosure, both an eRedCap feature (or a first reduced capability feature) and a RedCap feature (or a second reduced capability feature) may not be included in one feature combination. In other words, if an eRedCap feature is included in one feature combination, a RedCap feature may not be included. Alternatively, if a RedCap feature is included in one feature combination, an eRedCap feature may not be included. Alternatively, one feature combination may include neither a RedCap feature nor an eRedCap feature.

In some examples of the present disclosure, one feature combination (or feature group or capability set) may be associated with one RA resource set. A RA resource set may correspond to a set of preambles used in a random access procedure. For example, preambles for a feature combination may be defined by a start preamble, the number of preambles, etc.

For example, a first feature combination may include an eRedCap feature (or a first reduced capability feature). A first feature combination may be associated with a first RA set. A second feature combination may include a RedCap feature (or a second reduced capability feature). A second RA set may be associated with a second feature combination. Information about a feature combination and a RA resource set associated therewith may include both of a first feature combination and a first RA set, and a second feature combination and a second RA set, or only one of them.

Information about at least one feature combination and information about at least one RA resource set associated with at least one feature combination may be included in a system information block (SIB) and received by a terminal. System information may be commonly provided to multiple (or all) terminals within a cell.

In S720, a terminal may transmit a first message of a random access procedure to a network based on one RA resource set among at least one RA resource set.

In some examples of the present disclosure, when a terminal supports an eRedCap feature (or a first reduced capability feature), one RA resource set used to transmit a first message may be a first RA set (i.e., a preamble set associated with a first feature combination including an eRedCap feature (or a first reduced capability feature)).

In some examples of the present disclosure, an eRedCap feature (or a first reduced capability feature) may be configured in a RA resource set (or a preamble set) that is configured as a 4-level RA type. In other words, an eRedCap terminal may transmit a first message (or Msg1) of a 4-step random access procedure by including a preamble selected from a RA resource set associated with a feature combination including a eRedCap feature. A RedCap feature (or a second reduced capability feature) may be configured in a RA resource set (or a preamble set) configured as a 4-level RA type, or may be configured in a RA resource set (or a preamble set) configured as a 2-level RA type. In other words, a RedCap terminal may transmit a first message (or Msg1) of a 4-step random access procedure or a first message (or MsgA) of a 2-step random access procedure by including a preamble selected from a RA resource set associated with a feature combination including a RedCap feature.

In some examples of the present disclosure, a terminal supports an eRedCap feature (or a first reduced capability feature), but there may be no RA resource set associated with a first feature combination including an eRedCap feature (or a first reduced capability feature) among at least one (or all configured) RA resource set. In this case, one RA resource set used to transmit a first message may be a second RA set (i.e., a preamble set associated with a second feature combination including a RedCap feature (or a second reduced capability feature)).

A terminal may receive a second message (Msg2, or a random access response (RAR)) from a network after transmitting a first message (Msg1 or a PRACH preamble) of a 4-step random access procedure, and subsequently, a terminal may receive a fourth message (Msg4, a contention resolution message) from a network after transmitting a third message (Msg3 or PUSCH data). Alternatively, a terminal may receive a second message (MsgB) from a network after transmitting a first message (MsgA, or PRACH preamble transmission and PUSCH data transmission) of a 2-step random access procedure. PUSCH data transmitted by a terminal through Msg3 of a 4-step random access procedure or MsgA of a 2-step random access procedure may correspond to a message transmitted on an UL-SCH, and a corresponding message may include a common control channel (CCCH) service data unit (SDU).

In some examples of the present disclosure, a logical channel identifier (LCID) for UL-SCH/CCCH may be defined as a value distinguished for a terminal supporting an eRedCap feature (or a first reduced capability feature) and a RedCap feature (or a second reduced capability feature).

In some examples of the present disclosure, an initial uplink (UL) BWP may be commonly or independently configured for a terminal supporting an eRedCap feature (or a first reduced capability feature) and a terminal supporting a RedCap feature (or a second reduced capability feature). A first message (Msg1) and/or a third message (Msg3) of a 4-step random access procedure, or a first message (MsgA) of a 2-step random access procedure may be transmitted on an initial UL BWP.

In some examples of the present disclosure, an initial downlink (DL) BWP may be commonly or independently configured for a terminal supporting an eRedCap feature (or a first reduced capability feature) and a terminal supporting a RedCap feature (or a second reduced capability feature). A second message (Msg2) and/or a fourth message (Msg4) of a 4-step random access procedure, or a second message (MsgB) of a 2-step random access procedure may be received on an initial DL BWP.

In some examples of the present disclosure, an eRedCap feature (or a first reduced capability feature) may be a terminal that supports a reduced bandwidth (e.g., a bandwidth of less than 20 MHz (e.g., 5 MHz) for unicast described below), or a terminal that does not support a reduced bandwidth (e.g., a terminal that supports a 20 MHz bandwidth for unicast). In other words, a terminal with an eRedCap feature (or a first reduced capability feature) may use a common RA resource set and a common LCID without distinguishing between a terminal supporting a reduced bandwidth and a terminal supporting a reduced bandwidth. A terminal that supports a reduced bandwidth of an eRedCap feature (or a first reduced capability feature) and a terminal that does not support a reduced bandwidth may support a peak data rate of 10 Mbps.

A method described in an example of FIG. 7 may be performed by a first device 100 of FIG. 9 described later. For example, at least one processor 102 of a first device 100 in FIG. 9 may be configured to receive information about at least one feature combination and information about at least one RA resource set associated with at least one feature combination from a network through at least one transceiver, and transmit a first message of a random access procedure to a network based on one RA resource set of at least one RA resource set through at least one transceiver. Furthermore, at least one memory 104 of a first device 100 may store instructions for performing a method described in an example of FIG. 7 or examples described below when being executed by at least one processor 102.

Figure 8:
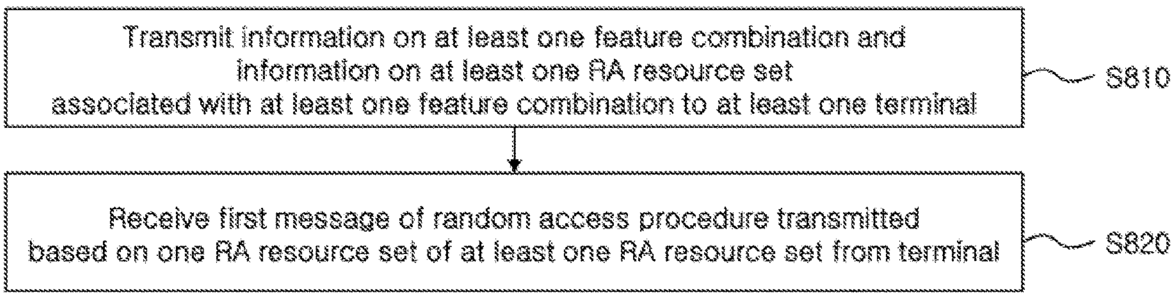
FIG. 8 is a diagram for describing an example of an operation of a base station according to the present disclosure.

FIG. 8 is a diagram for describing an example of an operation of a base station according to the present disclosure.

In S810, a base station may transmit information about at least one feature combination and information about at least one RA resource set associated with at least one feature combination to at least one terminal. For example, corresponding information may be commonly transmitted to at least one terminal as system information.

In S820, a base station may receive a first message of a random access procedure transmitted based on one RA resource set among at least one RA resource set from a terminal. In random access, there may be multiple terminals simultaneously transmitting a first message based on the same RA resource set. A different terminal may transmit a first message by selecting a different RA resource (or preamble) from the same RA resource set, and if there are multiple terminals selecting the same RA resource, contention may be resolved through a subsequent step of a random access procedure.

In an example of FIG. 8, a specific characteristic for at least one feature combination related to a first and second reduced capability, at least one resource set, LCID for UL-SCH/CCCH, an initial UL/DL-BWP, etc. is the same as described by referring to FIG. 7, so an overlapping description is omitted.

A method described in an example of FIG. 8 may be performed by a second device 200 of FIG. 9 described later. For example, at least one processor 202 of a second device 200 in FIG. 9 may be configured to transmit information about at least one feature combination and information about at least one RA resource set associated with at least one feature combination to at least one terminal through at least one transceiver, and receive a first message of a random access procedure transmitted based on one RA resource set of at least one RA resource set from a terminal through at least one transceiver. Furthermore, at least one memory 204 of a second device 200 may store instructions for performing a method described in an example of FIG. 8 or examples described below when being executed by at least one processor 202.

Below, various examples of initial access of various reduced capability terminals according to the present disclosure will be described.

Embodiment 1

This embodiment relates to an initial bandwidth part (BWP) in initial access of various reduced capability terminals.

In the following description, a term of a (separated) initial BWP includes a (separated) initial UL BWP, a (separated) initial DL BWP, or a (separated) initial UL BWP and a (separated) initial DL BWP.

For example, information on an initial BWP for each type/feature of a terminal may be provided through system information (e.g., a SIB) commonly provided to terminals in a cell including various reduced capability terminals. Accordingly, a network/a base station may know that a terminal operating on a specific initial BWP has a specific type/feature before receiving a terminal capability reporting message (e.g., a RRC message). For example, a network/a base station may optimize scheduling for a corresponding terminal to match the performance of various types/features of terminal having a reduced capability. In addition, a problem may be resolved that occurs when terminals with various types/features coexist in an initial access process.

For example, it may be assumed that a terminal that corresponds to a first reduced capability (e.g., eRedCap) terminal and does not support a reduced bandwidth (e.g., supports a maximum bandwidth of 20 MHz), a terminal that supports a reduced bandwidth (e.g., supports a maximum bandwidth of less than 20 MHz), a second reduced capability terminal (e.g., a RedCap terminal), and a general high-performance terminal (e.g., a non-RedCap terminal) coexist. Specifically, various capabilities may be defined that a size of a bandwidth that may be processed by a terminal for transmission or reception of unicast data (e.g., PDSCH/PUSCH data scheduled by a PDCCH which is CRC-scrambled by a C-RNTI or a temporary C-RNTI) is up to 100 MHz, 20 MHz, or less than 20 MHz. For example, a bandwidth of less than 20 MHz may correspond to a bandwidth of 5 MHz or less, and is referred to as a 5 MHz bandwidth in the following description as a non-limiting example. For example, a first reduced capability (e.g., eRedCap) terminal may be in detail classified as an eRedCap-1 terminal supporting a maximum bandwidth of 20 MHz, an eRedCap-2 terminal supporting a maximum bandwidth of 5 MHz, or an eRedCap-X (X=3, 4, . . . ) terminal supporting at least one other distinct feature/capability. As a representative example in the present disclosure, it is assumed that a RedCap terminal supports unicast scheduling with a 20 MHz bandwidth and a peak data rate of 50 Mbps, and an eRedCap-1 terminal supports unicast scheduling with a 20 MHz bandwidth and a peak data rate of 10 Mbps, and an eRedCap-2 terminal supports unicast scheduling with a bandwidth of 5 MHz and a peak data rate of 10 Mbps. If an eRedCap-X terminal with an additional detailed type/feature is defined, it may be assumed that an eRedCap-X terminal supports unicast scheduling of a bandwidth other than 20 MHz and 5 MHz.

In the present disclosure, various methods are described that allow terminals with a different feature (or feature combination) or a different reduced capability performance/feature to operate in one same initial BWP or to operate in a separate initial BWP. In this way, by configuring a plurality of initial BWPs (i.e., initial BWPs and separate initial BWPs) and associating/allocating a terminal with various capabilities to a separate initial BWP on a frequency domain, respectively, PUCCH resource shortage of various terminals may be resolved or additional unicast PDSCH/PUSCH scheduling may be performed to be appropriate for a feature of a corresponding terminal.

Configuration information on an initial uplink/downlink (UL/DL) BWP may be provided through a system information block (e.g., SIB1) received after a terminal acquires a master information block (MIB) through a SS/PBCH block. In addition, configuration information about a separate initial UL/DL BWP for a reduced capability terminal (i.e., a RedCap terminal) may be provided to a terminal through a SIB (e.g., SIB1). A separate initial BWP may correspond to an additional initial BWP based on a maximum bandwidth of 20 MHz that is different from an existing initial BWP (which may also be referred to as a basic (or default) initial BWP).

Information about a downlink basic initial BWP and a separate initial BWP may be included in DownlinkConfigCommonSIB included in a SIB. For example, DownlinkConfigCommonSIB may include a parameter such as frequencyInfoDL, initialDownlinkBWP, bcch-Config, pcch-Config, pei-Config-r17, initialDownlinkBWP-RedCap-r17, etc., wherein initialDownlinkBWP corresponds to a basic initial DL BWP, and initialDownlinkBWP-RedCap-r17 corresponds to a separate initial DL BWP described above.

Information about an uplink basic initial BWP and a separate initial BWP may be included in UplinkConfigCommonSIB included in a SIB. For example, UplinkConfigCommonSIB may include a parameter such as frequencyInfoUL, initialUplinkBWP, timeAlignmentTImerCommon, initialUplinkBWP-RedCap-r17, etc., wherein initialUplinkBWP corresponds to a basic initial UL BWP, and initialUplinkBWP-RedCap-r17 corresponds to a separate initial UL BWP described above.

If a parameter for a separate initial UL/DL BWP (e.g., initialUplinkBWP-RedCap-r17, initialDownlinkBWP-RedCap-r17) is included in a SIB, a RedCap terminal may use an active UL/DL BWP by applying/switching it to a separate initial UL/DL BWP (e.g., perform a random access procedure on an active UL/DL BWP). If a parameter for a separate initial UL/DL BWP is not included in a SIB, a RedCap terminal may use a BWP corresponding to a parameter for a basic initial UL/DL BWP (e.g., initialUplinkBWP, initialDownlinkBWP) by applying/switching it to an active UL/DL BWP.

Embodiment 1-1

This embodiment relates to a method for configuring at least one additional separate initial BWP for an eRedCap terminal. At least one additional separate initial BWP is distinguished from a separate initial BWP for a RedCap terminal, and may be configured by a higher layer (e.g., a SIB through a RRC message, etc.).

TABLE 6

| Type/Feature | Parameter for separate initial BWP |
|---|---|
| RedCap | initialDownlinkBWP-RedCap-r17initialUplinkBWP-RedCap-r17 |
| eRedCap-1 | initialDownlinkBWP-RedCap1-r18initialUplinkBWP-RedCap1-r18 |
| eRedCap-2 | initialDownlinkBWP-RedCap2-r18initialUplinkBWP-RedCap2-r18 |
| eRedCap-X | initialDownlinkBWP-RedCapX-r18initialUplinkBWP-RedCapX-r18 |

A variety of separate initial BWPs corresponding to a variety of terminal types/feature may be configured, and an additional separate initial BWP corresponding to an additional type/feature not illustrated in Table 6 (e.g., a bandwidth, a maximum throughput (or a peak data rate), etc.) may be further defined/configured, and a different separate initial BWP may be configured independently each other.

As an example, separate initial UL/DL BWPs corresponding to all detailed types/features (e.g., a bandwidth) of an eRedCap terminal may be independently defined/configured.

Additionally or alternatively, the number of separate initial UL/DL BWPs may be limited. A upper limit on the number of separated initial UL/DL BWPs may be predefined (being predefined in the present disclosure means that each of a terminal and a base station has corresponding information without separate signaling), or may be configured by a higher layer (being (pre)configured in the present disclosure means that corresponding information is provided between a terminal and a base station through signaling). It is to reduce overhead that occurs when defining/configuring a separate initial BWP for all combinations of various bandwidths and throughputs.

Additionally or alternatively, if a separate initial BWP for a particular reduced capability terminal is not configured through a RRC message (e.g., a SIB), a corresponding terminal may be predefined to use another separate initial BWP or a basic initial BWP.

Additionally or alternatively, if a separate initial BWP for a particular reduced capability terminal is not configured through a RRC message (e.g., a SIB), a corresponding terminal may be configured to use another separate initial BWP or a basic initial BWP through a RRC message (e.g., a SIB).

Additionally or alternatively, if a separate initial BWP for some reduced capability terminals is not configured through a RRC message (e.g., a SIB), a corresponding terminal may be predefined to use another separate initial BWP or a basic initial BWP. If a separate initial BWP for some other reduced capability terminals is not configured through a RRC message (e.g., a SIB), a corresponding terminal may be configured to use another separate initial BWP or a basic initial BWP through a RRC message (e.g., a SIB).

Embodiment 1-2

This embodiment relates to a method for configuring one additional separate initial BWP for an eRedCap terminal. One additional separate initial BWP is distinguished from a separate initial BWP for a RedCap terminal, and may be configured by a higher layer (e.g., a SIB through a RRC message, etc.).

In order to reduce the overhead of a frequency resource and complexity when various separate initial BWPs for various detailed types/features of eRedCap are defined/ configured as in Embodiment 1-1, one separate initial BWP commonly used by terminals of various detailed types/features of eRedCap may be defined/configured. Accordingly, a basic initial BWP, a first separate initial BWP (for RedCap), and a second separate initial BWP (for eRedCap) may be configured for a terminal.

As an example, when a second separate initial BWP is not configured, an eRedCap-1 terminal (e.g., an eRedCap terminal supporting a 20 MHz bandwidth for unicast) may use a basic initial BWP. Alternatively, when a second separate initial BWP is not configured, if a first separate initial BWP for RedCap is configured, an eRedCap-1 terminal may use it.

Additionally or alternatively, an eRedCap-1 terminal may be predefined or preconfigured (via a RRC message/a SIB) to use a second separate initial BWP. Alternatively, an eRedCap-1 terminal may be predefined or preconfigured (via a RRC message/a SIB) to use a first separate initial BWP.

Additionally or alternatively, an eRedCap-2 terminal (e.g., an eRedCap terminal supporting a 5 MHz bandwidth for unicast) may be predefined or may be preconfigured (through a RRC message/a SIB) to use a second separate initial BWP. Alternatively, an eRedCap-2 terminal may be predefined or preconfigured (via a RRC message/a SIB) to use a first separate initial BWP.

Additionally or alternatively, an eRedCap-1 terminal may operate by being tied with or in the same way as a RedCap terminal. In other words, when a first separate initial BWP is configured, an eRedCap-1 terminal may use it, and if a first separate initial BWP is not configured, it may use a basic initial BWP.

Additionally or alternatively, an eRedCap-1 terminal may operate by being tied with or in the same way as an eRedCap-2 terminal. In other words, in examples described above, a description of an eRedCap-1 terminal or an eRedCap-2 terminal may be replaced with a description of an eRedCap terminal.

Embodiment 1-3

This embodiment relates to a method for configuring one separate initial BWP for a RedCap terminal and an eRedCap terminal. One separate initial BWP is distinguished from a basic initial BWP, and may be configured by a higher layer (e.g., a SIB through a RRC message, etc.).

One separate initial BWP may correspond to an initial BWP commonly applied to all RedCap terminals, eRedCap terminals, and (if any) additional reduced capability terminals which will be defined in the future. For example, an independent separate initial BWP is not configured for various types/features of reduced capability terminals in an example of Table 6, but one separate initial BWP may be configured. Accordingly, the overhead of a frequency resource according to a separate initial BWP configuration may be further reduced.

Here, a feature including both RedCap and eRedCap may be referred to as (e)RedCap. For example, if initialDownlinkBWP-RedCap-r17 exists in DownlinkConfigCommonSIB, (e)RedCap terminals may use a corresponding DL BWP (i.e., a separate initial BWP corresponding to initialDownlinkBWP-RedCap-r17) instead of a basic initial DL BWP (i.e., initialDownlinkBWP). For example, if initialDownlinkBWP-RedCap-r17 does not exist (is absent) in DownlinkConfigCommonSIB, (e)RedCap terminals may use a basic initial DL BWP (i.e., initialDownlinkBWP). For example, if initialUplinkBWP-RedCap-r17 exists in UplinkConfigCommonSIB, (e)RedCap terminals may use a corresponding UL BWP (i.e., a separate initial BWP corresponding to initialUplinkBWP-RedCap-r17) instead of a basic initial UL BWP (i.e., initialUplinkBWP). For example, if initialUplinkBWP-RedCap-r17 does not exist (is absent) in UplinkConfigCommonSIB, (e)RedCap terminals may use a basic initial DL BWP (i.e., initialUplinkBWP).

Alternatively, one separate initial BWP may be a first separate initial BWP configurable for a RedCap terminal, or a second separate initial BWP configurable for an eRedCap terminal, or a third separate initial BWP configurable for an additional reduced capability terminal which will be defined in the future, but only any one of first, second, and third separate initial BWPs may be configured (i.e., they may not be configured simultaneously). For example, an independent separate initial BWP may be configured for various types/features of reduced capability terminals in an example of Table 6, but only one separate initial BWP of them may be configured. Accordingly, the overhead of a frequency resource according to a separate initial BWP configuration may be further reduced.

As an example, an eRedCap-1 terminal (e.g., an eRedCap terminal supporting a 20 MHz bandwidth for unicast) may operate by being tied with or in the same way as a RedCap terminal. In other words, if one separate initial BWP is configured, an eRedCap-1 terminal may use it, and if one separate initial BWP is not configured, it may use a basic initial BWP.

Additionally or alternatively, an eRedCap-1 terminal may operate by being tied with or in the same way as an eRedCap-2 terminal. In other words, if one separate initial BWP is configured, an eRedCap (e.g., eRedCap-1, eRedCap-2, eRedCap-X, . . . ) terminal may use it, and if separate initial BWPs are configured, it may use them, and if one separate initial BWP is not configured, it may use a basic initial BWP.

Additionally or alternatively, if one separate initial BWP is not configured through a RRC message (e.g., a SIB), it may be predefined to use a basic initial BWP.

Additionally or alternatively, if only one separate initial BWP is configurable, a second separate initial BWP for an eRedCap terminal which is distinct from a first separate initial BWP for the existing RedCap terminal may be defined as a configurable parameter. For example, initialDownlinkBWP-RedCap-r17 and initialDownlinkBWP-RedCap-r18 (or initialDownlinkBWP-eRedCap-r18) may be defined as configurable parameters in DownlinkConfigCommonSIB configuration information, and initialUplinkBWP-RedCap-r17 and initialUplinkBWP-RedCap-r18 (or initialUplinkBWP-eRedCap-r18) may be defined as configurable parameters in UplinkConfigCommonSIB configuration information.

More specifically, when only one separate initial BWP may be configured for a RedCap terminal and eRedCap (e.g., eRedCap-1, eRedCap-2, eRedCap-X, . . . ), an additional separate initial BWP for an eRedCap terminal may not be necessary. If only a RedCap terminal is defined to use a first separate initial BWP parameter (e.g., initialUplinkBWP-RedCap-r17 and/or initialDownlinkBWP-RedCap-r17) when it exists in configuration information (e.g., UplinkConfigCommonSIB and/or DownlinkConfigCommonSIB) and use a basic initial BWP when a first separate initial BWP parameter does not exist in configuration information, an eRedCap terminal, not a RedCap terminal, may not use a first separate initial BWP parameter. In other words, if only one separate initial BWP is configured in a system, a RedCap terminal may use a basic initial BWP, and an eRedCap terminal may not receive support for using a first separate initial BWP. Accordingly, it is necessary to define a second separate initial BWP for an eRedCap terminal that is distinct from (or does not conflict with) a first separate initial BWP for a RedCap terminal. In this case, a second separate initial BWP for an eRedCap terminal may be configured only when a first separate initial BWP for a RedCap terminal is not configured.

Additionally or alternatively, if a basic initial BWP and a first separate initial BWP for a RedCap terminal are configured, an initial BWP for eRedCap (e.g., eRedCap-1, eRedCap-2, eRedCap-X, . . . ) may be applied as follows. For example, which initial BWP between a basic initial BWP and a first separate initial BWP will be used may be predefined or may be configured through a RRC message (e.g., a SIB) for each eRedCap-1, eRedCap-2, eRedCap-X, . . . type/feature of terminal. Alternatively, which initial BWP between a basic initial BWP and a first separate initial BWP will be used may be predefined for some types/features of terminal among eRedCap-1, eRedCap-2, eRedCap-X, . . . types/features of terminal, and which initial BWP between a basic initial BWP and a first separate initial BWP will be used may be configured through a RRC message (e.g., a SIB) for the remaining types/features of terminal.

Additionally or alternatively, if a basic initial BWP and a second separate initial BWP for an eRedCap terminal are configured, an initial BWP for eRedCap (e.g., eRedCap-1, eRedCap-2, eRedCap-X, . . . ) may be applied as follows. For example, which initial BWP between a basic initial BWP and a second separate initial BWP will be used may be predefined or may be configured through a RRC message (e.g., a SIB) for each eRedCap-1, eRedCap-2, eRedCap-X, . . . type/feature of terminal. Alternatively, which initial BWP between a basic initial BWP and a second separate initial BWP will be used may be predefined for some types/features of terminal among eRedCap-1, eRedCap-2, eRedCap-X, . . . types/features of terminal, and which initial BWP between a basic initial BWP and a second separate initial BWP will be used may be configured through a RRC message (e.g., a SIB) for the remaining types/features of terminal.

Embodiment 1-4

The above-described eRedCap-2 type/feature (i.e., 5 MHz bandwidth support for unicast) is distinct from a RedCap type/feature from an unicast bandwidth and throughput perspective, and an eRedCap-2 type/feature (i.e., 20 MHz bandwidth support for unicast) is the same as a RedCap type/feature from an unicast bandwidth perspective and is distinct from a RedCap type/feature from a throughput perspective. Considering this, an eRedCap-1 terminal may be defined to operate in the same way as a RedCap terminal.

In an example, an eRedCap-1 type/feature may be considered the same type/feature as a RedCap type/feature. In other words, an eRedCap-1 terminal uses the same separate initial BWP as a RedCap terminal, and may use a basic initial BWP if there is no configuration for a separate initial BWP. In this case, even if another separate initial BWP for an eRedCap terminal is configured, an eRedCap-1 terminal may not use corresponding another separate initial BWP.

Additionally or alternatively, an eRedCap-1 type/feature may be considered the same type/feature as an eRedCap-2 type/feature. In other words, the same initial BWP may be used without distinguishing a detailed type/feature of eRedCap. For example, if a second separate initial BWP for an eRedCap terminal is configured, an eRedCap terminal may use a second separate initial BWP, and if there is no configuration for a second separate initial BWP, an eRedCap terminal may use a basic initial BWP. If a first separate initial BWP for a RedCap terminal is configured, an eRedCap terminal may use a first separate initial BWP when a second separate initial BWP for an eRedCap terminal is not configured.

In examples described above, a separate initial BWP for a RedCap terminal and/or a separate initial BWP for an eRedCap terminal may be configured for each of an UL and a DL, while a separate initial BWP for an eRedCap terminal may be configured/defined only for an UL. In order for a base station to early distinguish a type/a feature of a corresponding terminal through uplink transmission of a terminal in an initial access process, an additional separate initial BWP may be defined to be configurable only for an UL.

In an example, a separate initial BWP for an eRedCap terminal may not be configured/defined for a DL, but may be configured/defined only for an UL. For example, initialUplinkBWP-RedCap-r18 (or initialUplinkBWP-eRedCap-r18) is defined as a configurable parameter in RRC configuration information for an uplink (e.g., UplinkConfigCommonSIB), but initialDownlinkBWP-RedCap-r18 (or initialDownlinkBWP-eRedCap-r18) may not be defined/included in RRC configuration information for a downlink (e.g., DownlinkConfigCommonSIB).

Additionally or alternatively, if a separate initial BWP dedicated to an eRedCap terminal is configured, an early indication method of an eRedCap feature (or a feature combination including an eRedCap feature) through a random access resource (or preamble) set of a first message (Msg1 or MsgA) in a random access procedure of an eRedCap terminal may be defined not to be configured/applied within a corresponding cell. Accordingly, complexity may be reduced by reducing partitioning of a random access resource for each feature/feature combination. It may apply to both an eRedCap-1 type/feature (i.e., 20 MHz bandwidth support) and an eRedCap-2 type/feature (i.e., 5 MHz bandwidth support).

In examples described above, when at least one basic initial BWP and at least one separate initial BWP are configured, which initial BWP is used for each of a RedCap terminal and an eRedCap terminal may be configured through higher layer signaling.

For example, which initial BWP is used among at least one basic initial BWP and at least one separate initial BWP for an eRedCap-1 terminal (i.e., 20 MHz bandwidth support) may be predefined or may be configured through a RRC message (e.g., a SIB).

Additionally or alternatively, which initial BWP is used among at least one basic initial BWP and at least one separate initial BWP for an eRedCap-2 terminal (i.e., 5 MHz bandwidth support) may be predefined or may be configured through a RRC message (e.g., a SIB).

Embodiment 2

This embodiment relates to a random access resource for early indication of a feature combination in initial access of various reduced capability terminals.

By assuming a feature combination of various terminals within a cell, a network/a base station may provide (e.g., signal through a SIB) information about at least one feature combination and information about a random access resource set corresponding to at least one feature combination to terminals within a cell. Based on this information, a terminal may select a random access resource (or preamble)

of a first message (Msg1 or MsgA) of random access among random access resource sets corresponding to a feature combination where features supported by it are included (based on a priority of features when there are multiple feature combinations) in an initial access process and transmit it to a network/a base station. A network/a base station that received a first message of a random access procedure may detect/acquire a feature combination supported by a corresponding terminal from a random access resource set to which a preamble selected by a corresponding terminal belongs.

For example, among higher layer (e.g., RRC) information elements, configuration information called FeatureCombination may include a field corresponding to a feature such as msg3-repetition, smallData, nsag, RedCap, etc. and FeatureCombination may be configured as a combination of at least one of them. Information about a random access resource set (i.e., a set of preamble candidates of a first message of a random access procedure) associated with each FeatureCombination may be included, for example, in higher layer configuration information called FeatureCombinationPreambles.

A plurality of feature combinations (e.g., FeatureCombination) as above may be configured. For example, if one feature combination including a RedCap field and a msg3-Repetition field is assumed, a terminal that supports both RedCap and msg3-Repetition features may perform an early indication for a feature combination by using a preamble selected from one random access resource set associated with a corresponding feature combination to transmit a first message of a random access procedure. Alternatively, if another feature combination including only a RedCap field is assumed, a terminal supporting only a RedCap feature may perform an early indication for a feature combination by using a preamble selected from another random access resource set associated with a corresponding feature combination to transmit a first message of a random access procedure.

Additionally or alternatively, for a subsequent uplink message of a random access procedure (Msg3/UL-SCH/PUSCH or UL-SCH/PUSCH of MsgA), a LCID value for CCCH/UL-SCH of a terminal supporting a specific capability/feature may be configured differently from a LCID value for CCCH/UL-SCH of a terminal not supporting a specific capability/feature to early indicate a type/a feature/a capability of a terminal to a network/a base station.

As described above, when a terminal with various features/capabilities such as a non-RedCap terminal, a RedCap terminal, an eRedCap terminal, etc. coexists, if a network/a base station may not early detect/acquire a terminal feature/capability, until receiving terminal capability reporting (it is reported from a terminal to a base station when general PUSCH transmission or reception between a terminal and a network is possible after a random access procedure), it may be configured to perform only the minimum/limited function which may be commonly applied to a different type and performance of terminals, or if a specific function is performed, a terminal which does not support a corresponding specific function may not normally communicate with a network. Accordingly, before terminal capability reporting, a method for early indicating a type/a feature/a capability supported by a specific terminal to a base station is required.

In this embodiment, for an early indication of a feature/a capability of a terminal including RedCap, eRedCap, etc., examples based on an uplink message of a random access procedure during an initial access process of a terminal (e.g., a first message (Msg1)/PRACH/preamble and/or a subsequent uplink message (Msg3)/UL-SCH/PUSCH) of a 4-step random access type, or a PRACH/a preamble and/or an UL-SCH/a PUSCH of MsgA of a 2-step random access type) are described. Accordingly, before terminal capability reporting, a base station may appropriately configure/apply performance of a corresponding terminal such as processing time, the maximum usage bandwidth, etc. for terminals with a variety of performance.

Although an early indication method for the existing RedCap terminal is defined, an early indication method for an eRedCap terminal is not defined, and furthermore, an early indication method for a detailed feature of an eRedCap terminal (e.g., eRedCap-1, eRedCap-2, eRedCap-X, . . . ) is also not defined. Accordingly, there is a need to define a new method for an early indication in a random access procedure for various features/feature combinations including eRedCap.

For example, for the above-described early indication method (e.g., a configuration of a random access resource set associated with a feature combination and/or a definition of LCID for an UL-SCH/PUSCH of a random access procedure), if it is modified to divide all of RedCap, eRedCap (in more detail, eRedCap-1, eRedCap-2, eRedCap-X, . . . ), the overhead of preamble partitioning may increase and a LCID value may become insufficient. Accordingly, the present disclosure describes examples for an early indication and scheduling that efficiently support various reduced capability terminals.

Embodiment 2-1

This embodiment relates to a method for early indicating a terminal feature supporting a 20 MHz bandwidth.

For example, a first message (PRACH/a preamble of Msg1 or MsgA) based method of random access for an early indication to each type/feature of various reduced capability terminals (e.g., a distinct random access resource (or preamble) set and/or PRACH resource (e.g., time-frequency resource, or PRACH occasion) configuration) and/or a subsequent uplink message (UL-SCH/PUSCH of Msg3 or MsgA) based method of random access may be applied (e.g., predefine a distinct LCID). For example, depending on a type/a feature of a terminal, an early indication method may be defined as in Table 7 below.

TABLE 7

| Type/Feature | First message (PRACH/ Preamble of Msg1 or MsgA) | Subsequent uplink message (PUSCH/UL-SCH of Msg3 or MsgA) | Terminal capability reporting |
|---|---|---|---|
| RedCap | Random access resource associated with feature combination including RedCap-r17 | LCID(CCCH) | R17 RedCap (20 MHz bandwidth) and 50 Mbps |
| eRedCap-1 | Random access resource (preamble) set and/or PRACH resource associated with feature combination including eRedCap1-r18 | LCID(CCCH)-1 | R18 eRedCap (20 MHz bandwidth) and 10 Mbps |

TABLE 7-continued

| Type/Feature | First message (PRACH/ Preamble of Msg1 or MsgA) | Subsequent uplink message (PUSCH/UL-SCH of Msg3 or MsgA) | Terminal capability reporting |
|---|---|---|---|
| eRedCap-2 | Random access resource (preamble) set and/or PRACH resource associated with feature combination including eRedCap2-r18 | LCID(CCCH)-2 | R18 eRedCap(5 MHz bandwidth) and 10 Mbps |
| eRedCap-X | Random access resource (preamble) set and/or PRACH resource associated with feature combination including eRedCapX-r18 | LCID(CCCH)-X | R18 eRedCap (TBD MHz bandwidth) and TBD Mbps |

In Table 7, a TBD does not mean the same value, but represents a random value to be determined in the future. For example, for an eRedCap-X type/feature, the maximum bandwidth other than 20 MHz and 5 MHz may be supported, and/or a throughput other than 10 Mbps may be supported.

eRedCap1-r18, eRedCap2-r18, and eRedCapX-r18 related to a first message in Table 7 may be defined as a field that may be included (or configured as true) in feature combination configuration information (e.g., FeatureCombination). FeatureCombination may include at least one of the existing redcap-r17, smallData, nsag and msg3-Repetitions fields.

LCID-1, LCID-2, and LCID-X related to a subsequent uplink message in Table 7 may correspond to a new value distinct from the existing LCID for a RedCap terminal. For example, for a RedCap terminal, a different LCID value may be defined for a CCCH in a different size, and for an eRedCap (specifically, eRedCap-1, eRedCap-2, eRedCap-X, . . . ) terminal, a different LCID value may be defined for a CCCH in a different size.

As an example, for each type/feature of various reduced capability terminals, an independent random access resource set/PRACH resource for a first message-based early indication may be configured, and/or an independent LCID for a subsequent uplink message-based early indication may be predefined. If a method itself for a first message-based early indication is defined, but is not configured for a terminal, a network/a base station may detect/acquire a reduced capability type/feature of a corresponding terminal through a method for a subsequent uplink message-based early indication.

Embodiment 2-2

This embodiment relates to a method for an eRedCap terminal to share a configuration/definition for an early indication of an existing RedCap terminal.

In order to reduce complexity when independently applying various configurations/definitions for an early indication for various detailed types/features of eRedCap as in Embodiment 2-1, a configuration for an early indication of a RedCap terminal may be applied to an eRedCap terminal when there is no configuration for an early indication for various detailed types/features of eRedCap.

As an example, a terminal having various types/features belonging to eRedCap may share a configuration for a random access resource (or preamble) and/or a PRACH resource (or time-frequency resource) for a first message (a PRACH/a preamble of Msg1 or MsgA) for a RedCap terminal. In this case, a network/a base station may confirm that a terminal that transmitted a first message through a corresponding preamble/PRACH resource is a RedCap terminal or a terminal with various types/features of eRedCap, and a more specific type/feature of a corresponding terminal may be distinguished based on the LCID of a subsequent uplink message of a random access procedure. For example, if an eRedCap terminal has a configuration of a random access resource/PRACH resource for a first message-based early indication for a detailed type/feature of eRedCap as in Embodiment 2-1, a terminal with a detailed type/feature of corresponding eRedCap may use it, and otherwise, it may use a configuration of a random access resource/PRACH resource for a first message-based early indication for a RedCap terminal. Alternatively, if a random access resource/PRACH resource itself for a first message-based early indication for a detailed type/feature of eRedCap is not defined, a terminal with a detailed type/feature of corresponding eRedCap may use a configuration of a random access resource/PRACH resource for a first message-based early indication for a RedCap terminal.

Additionally or alternatively, a terminal with a first type/feature of eRedCap may share a configuration for a random access resource (or preamble) and/or a PRACH resource (or time-frequency resource) for a first message (a PRACH/a preamble of Msg1 or MsgA) for a terminal with a second type/feature of eRedCap. For example, if a random access resource/PRACH resource for a first message-based early indication for a first type/feature of eRedCap is configured, a terminal with a first type/feature of eRedCap may use it, and otherwise, it may use a configuration of a random access resource/PRACH resource for a first message-based early indication for a second type/feature of eRedCap. Alternatively, if a random access resource/PRACH resource itself for a first message-based early indication for a first type/feature of eRedCap is not defined, a terminal with a first type/feature of eRedCap may use a configuration of a random access resource/PRACH resource for a first message-based early indication for a second type/feature of eRedCap. For example, if a resource for a first message-based early indication of eRedCap-1 is configured and a resource for a first message-based early indication of eRedCap-2 or eRedCap-X is not configured in Table 7, an eRedCap-2 terminal or an eRedCap-X terminal may use a resource for a first message-based early indication for eRedCap-1.

If a resource for a first message-based early indication associated with a type/a feature of a terminal is not configured/defined, which of configured/defined resources will be used for a first message-based early indication associated with a different type/feature may be configured or predefined through higher layer signaling for a corresponding terminal. For example, if a resource for a first message-based early indication is configured/defined for RedCap and eRedCap-1, respectively, and a resource for a first message-based early indication for eRedCap-2 is not configured/defined, which resource for a first message-based early indication associated which a type/a feature between RedCap and eRedCap-1 will be used for an eRedCap-2 terminal may be configured or predefined by a network/a base station. Alternatively, if a first resource for a first message-based early indication associated with RedCap, and a second resource for a first message-based early indication associated with eRedCap-2 are configured, and a resource for a first message-based early indication for eRedCap-1 is not configured/defined, which of a first resource or a second resource an eRedCap-1 terminal will use may be configured or predefined through a RRC message (e.g., a SIB).

Embodiment 2-3

This embodiment relates to a method for distinguishing a LCID value for an eRedCap terminal from a LCID value for a RedCap terminal or defining (i.e., sharing) them as the same value, with regard to a LCID for an early indication based on a subsequent uplink message of random access (e.g., a PUSCH/an UL-SCH of a third message (Msg3) of a 4-step random access type or a first message (MsgA) of a 2-step random access type).

Since a LCID used in a subsequent uplink message-based early indication of random access is not configured by a network/a base station, but is predefined, it is required to efficiently define a LCID value corresponding to a type/a feature of various reduced capabilities in order to prevent the lack of LCID candidate values limited by a length of a LCID.

As an example, one LCID commonly applied to eRedCap-1, eRedCap-2, eRedCap-X, . . . may be defined. For example, a LCID may be defined as a different value for each CCCH size, but it may not be defined as a different value for each detailed type/feature of eRedCap. A LCID common to eRedCap terminals of various detailed types/features may or may not be shared with (i.e., the same as) a LCID for a RedCap terminal.

Additionally or alternatively, a LCID may be predefined for some type(s)/feature(s) of eRedCap-1, eRedCap-2, eRedCap-X, . . . , and a LCID may not be predefined for some remaining type(s)/feature(s). In this case, a terminal of detailed type(s)/feature(s) of eRedCap for which a LCID is not predefined may use a LCID for detailed type(s)/feature(s) of eRedCap for which a LCID is predefined, or may use a LCID predefined for a RedCap terminal. For example, if a LCID value for a RedCap terminal is preconfigured as 1000 and a LCID value for an eRedCap-1 terminal is preconfigured as 2000, an eRedCap-2 terminal may use 1000 or 2000 as a LCID value in a subsequent uplink message of random access. Which of predefined LCID values will be used for a different type/feature may be configured or predefined for a terminal through higher layer signaling.

Additionally or alternatively, if an eRedCap-2 (e.g., supporting a bandwidth of 5 MHz for unicast) terminal also additionally supports a small data transmission (SDT) feature, a LCID of a CCCH may be predefined separately for a feature combination of eRedCap-2 and SDT (e.g., as a LCID value that is distinct from a LCID corresponding only to an eRedCap-2 feature and a LCID corresponding only to a SDT feature).

When a configuration/definition for a random access resource/PRACH resource for a first message-based early indication of random access is not provided for a specific detailed type/feature of eRedCap, if a resource for a first message-based early indication for RedCap or a different detailed type/feature of eRedCap is not shared, a corresponding eRedCap terminal may use a random access resource/PRACH resource configured/defined for a non-RedCap terminal. In this case, an early indication for a type/a feature of a corresponding terminal may be performed as follows through only a LCID of a subsequent uplink message of random access.

As an example, an eRedCap terminal incapable of applying a first message-based early indication may use a new LCID predefined for eRedCap to transmit a subsequent uplink message of a random access procedure. An eRedCap terminal for which a resource for a first message-based early indication is configured/defined may use a LCID for non-RedCap or a LCID for RedCap in a subsequent uplink message of random access. Here, whether to use a LCID for non-RedCap or a LCID for RedCap may be configured or predefined by higher layer signaling.

Additionally or alternatively, an eRedCap terminal incapable of applying a first message-based early indication may use a LCID for non-RedCap or a LCID for RedCap in a subsequent uplink message of random access. Here, whether to use a LCID for non-RedCap or a LCID for RedCap may be configured or predefined by higher layer signaling.

Embodiment 2-4

As in Table 7 described above, for each of various detailed types/features of eRedCap, a resource (e.g., a random access resource (preamble) set/a PRACH resource) for a first message-based early indication of a random access procedure may be configured and/or a LCID for a subsequent uplink message-based early indication of a random access procedure may be predefined. For a type/a feature of a new reduced capability that may be additionally defined in the future, a resource/a LCID for an early indication for any one or all or part of RedCap/eRedCap types/features defined in Table 7 may be configured/defined to be used/shared. In other words, rather than newly configuring/defining a resource/a LCID for an independent early indication, an early indication for a type/a feature of a new reduced capability may be supported through any one or a combination of a first message-based early indication resource and a subsequent uplink message-based early indication LCID according to the present disclosure.

Additionally or alternatively, a first message-based early indication resource and a subsequent uplink message-based early indication LCID for a RedCap type/feature are defined. Considering this, a resource for a first message-based early indication of a random access procedure may be shared for each of a RedCap type, an eRedCap-1 type and an eRedCap-2 type without being independently defined. Additionally or alternatively, a LCID for a subsequent uplink message-based early indication of a random access procedure may be shared for each of a RedCap type, an eRedCap-1 type and an eRedCap-2 type without being independently defined. In this case, since a base station may not detect a type/a feature of a reduced capability terminal before terminal capability reporting is performed, a method for supplementing this is required.

As an example, an eRedCap-1 terminal (i.e., an eRedCap terminal supporting a 20 MHz bandwidth) may share a first message-based early indication resource configured for a RedCap terminal. And, for an eRedCap-1 terminal (i.e., an eRedCap terminal supporting a 5 MHz bandwidth), a first message-based early indication resource that is distinct from a first message-based early indication resource configured for a RedCap terminal may be configured/defined.

Additionally or alternatively, an eRedCap-1 terminal (i.e., an eRedCap terminal supporting a 20 MHz bandwidth) may share subsequent uplink message-based early indication LCID value(s) defined for a RedCap terminal. And, for an eRedCap-1 terminal (i.e., an eRedCap terminal supporting a 5 MHz bandwidth), subsequent uplink message-based early indication LCID value(s) that are distinct from subsequent uplink message-based early indication LCID value(s) defined for a RedCap terminal may be defined. In this case, for a first message-based early indication, an eRedCap-2 terminal may use a first message-based early indication resource configured/defined for a RedCap terminal, or may use a first message-based early indication resource configured/defined for an eRedCap-2 terminal. Among them, which first message-based early indication resource will be used may be configured by a higher layer.

Additionally or alternatively, an eRedCap-1 terminal may share subsequent uplink message-based early indication LCID value(s) defined for an eRedCap terminal. In other words, without distinguishing between eRedCap-1 and eRedCap-2, subsequent uplink messages-based early LCID value(s) may be predefined commonly for an eRedCap terminal.

A first message-based early indication resource of a random access procedure may be defined as a field that may include an eRedCap feature and a RedCap feature in configuration information of an associated feature combination (e.g., a FeatureCombination information element). In this case, considering that one terminal does not repeatedly have all of RedCap type, eRedCap-1 type and eRedCap-2 types/features, a terminal may be predefined not to expect a configuration in which a RedCap feature and an eRedCap feature are simultaneously included in configuration information of one feature combination (e.g., a FeatureCombination information element). In other words, it may be predefined that both a RedCap feature and an eRedCap feature are not included in configuration information (e.g., a FeatureCombination information element) of one feature combination generated by a base station (i.e., the fields RedCap and eRedCap shall not be both set true). Here, eRedCap may include all types/features such as eRedCap-1, eRedCap-2, eRedCap-X, etc. (i.e., eRedCap-1, eRedCap-2, and eRedCap-X type/feature terminals use a random access resource set associated with a feature combination including an eRedCap feature).

Additionally or alternatively, for a case in which a first message-based early indication resource associated with a RedCap feature and a first message-based early indication resource associated with an eRedCap feature are configured respectively, each of a terminal having a RedCap feature/capability and a terminal having an eRedCap feature/capability may independently use a corresponding first message-based early indication resource. For example, it may be defined that basically, a terminal that supports all features included in one FeatureCombination may use a first message-based early indication resource associated with corresponding one FeatureCombination, but a terminal that does not support both RedCap and eRedCap (i.e., a terminal that supports RedCap or eRedCap) may use an early indication associated with corresponding one FeatureCombination. For example, multiple FeatureCombinations that separately include RedCap and eRedCap may not be configured, and one FeatureCombination may include RedCap and eRedCap. In this case, a first message-based early indication resource associated with RedCap and eRedCap may not be distinguished, but RedCap and eRedCap features may be distinguished through a subsequent uplink message-based early indication LCID value. In other words, for a plurality of features configured together in one FeatureCombination, the use of a first message-based early indication resource associated therewith may be allowed to apply independently (i.e., use a corresponding first message-based early indication resource even if any one of a plurality of features is supported), and a plurality of such allowed features may be limited to features related to RedCap and eRedCap.

Additionally or alternatively, if an eRedCap-1 (i.e., 20 MHz bandwidth support) feature and an eRedCap-2 (i.e., 5 MHz bandwidth support) feature are predefined as a feature that may be included in a feature combination, eRedCap-1 and eRedCap-2 fields may be configured simultaneously in one FeatureCombination. In this case, an eRedCap-1 terminal and an eRedCap-2 terminal may not be distinguished through a first message-based early indication resource associated with corresponding FeatureCombination, but eRedCap-1 and eRedCap-2 features may be distinguished through a subsequent uplink message-based early indication LCID value.

Alternatively, if an eRedCap-1 (i.e., 20 MHz bandwidth support) feature and an eRedCap-2 (i.e., 5 MHz bandwidth support) feature are predefined as a feature that may be included in a feature combination, there may be a limit that eRedCap-1 and eRedCap-2 fields are not configured simultaneously in one FeatureCombination. It considers the low possibility of supporting both eRedCap-1 and eRedCap-2 features.

In examples described above, a description for a LCID of Msg3 in a 4-step random access procedure may be applied as an example of a LCID for MsgA in a 2-step random access procedure. It may correspond to examples for a subsequent uplink message-based early indication LCID of a random access procedure.

Additionally or alternatively, a first message-based early indication resource for eRedCap may be configured only for an initial UL BWP (or a separate initial UL BWP) in which a first message-based early indication resource for RedCap is not configured. In other words, in an initial UL BWP (or a separate initial UL BWP) in which a first message-based early indication resource for RedCap is not configured, a first message-based early indication resource for eRedCap may not be configured. Here, eRedCap may be replaced with eRedCap-1 or eRedCap-2, or may collectively refer to eRedCap-1 and eRedCap-2.

In examples described above, as an example of a first message-based early indication resource, a random access resource (or preamble) set, and a PRACH resource (or a PRACH occasion) were described. In this regard, among a plurality of preamble sets and/or a plurality of PRACH occasions configured for a terminal, which preamble set and/or which PRACH occasion will be used may be predefined or may be configured through RRC signaling (e.g., a SIB) according to a feature of a terminal.

As an example, for an eRedCap-1 (i.e., 20 MHz bandwidth support) feature, which preamble set/PRACH occasion will be used may be predefined, or may be configured through RRC signaling (e.g., a SIB). Additionally or alternatively, for an eRedCap-2 (i.e., 5 MHz bandwidth support) feature, which preamble set/PRACH occasion will be used may be predefined, or may be configured through RRC signaling (e.g., a SIB). Here, for each preamble set/PRACH occasion, whether a first message-based early indication and/or a subsequent uplink message-based early indication is predefined for each feature may be configured through RRC signaling (e.g., a SIB) or may be predefined.

According to various examples of the present disclosure described above, for terminals of various types/features such as an existing RedCap terminal and an additionally introduced eRedCap (or eRedCap-1 and eRedCap-2) terminal, load balancing and efficient scheduling of a base station may be optimized through various examples of an operation in an initial BWP and a separate initial BWP, and in addition, efficient resource utilization may be possible and complexity and overhead may be reduced through various examples for an early indication of a terminal type/feature based on a first message and/or through a subsequent uplink message of a random access procedure before terminal capability reporting.

General Device to which the Present Disclosure May be Applied

Figure 9:
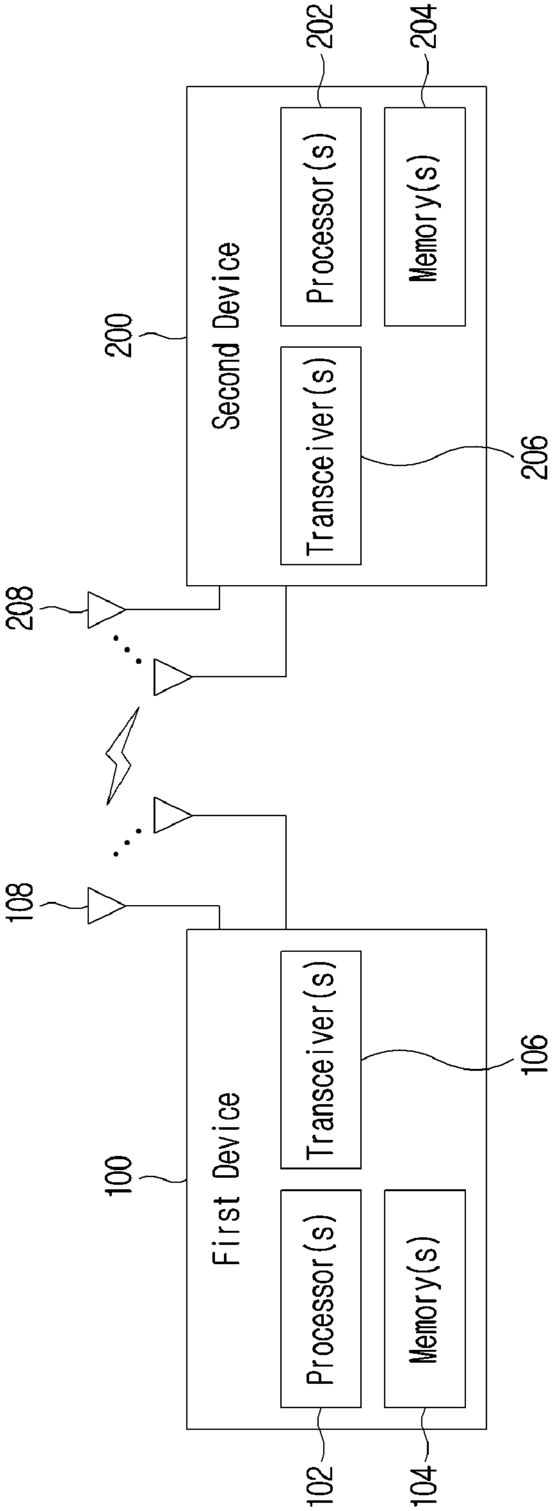
FIG. 9 illustrates a block diagram of a wireless communication device according to an embodiment of the present disclosure.

FIG. 9 is a diagram which illustrates a block diagram of a wireless communication device according to an embodiment of the present disclosure.

In reference to FIG. 9, a first wireless device 100 and a second wireless device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a terminal in a wireless communication system, the method comprising:

receiving, from a network, information on at least one feature combination, and information on at least one random access (RA) resource set associated with the at least one feature combination; and based on one RA resource set of the at least one RA resource set, transmitting a first message of a random access procedure to the network, wherein based on a first feature combination being associated with a first RA resource set and a second feature combination being associated with a second RA resource set:

the first feature combination includes a first reduced capability feature, the second feature combination includes a second reduced capability feature, both the first reduced capability feature and the second reduced capability feature are not included in one feature combination.

2. The method of claim 1, wherein:

based on the terminal supporting the first reduced capability feature, the one RA resource set is the first RA resource set.

3. The method of claim 1, wherein:

the first reduced capability feature is configured in the first RA resource set configured as a 4-step RA type.

4. The method of claim 1, wherein:

based on the terminal supporting the first reduced capability feature, and based on there being no RA resource set associated with the first feature combination among the at least one RA resource set:

the one RA resource set is the second RA resource set.

5. The method of claim 1, wherein:

at least one logical channel identifier (LCID) value for at least one common control channel (CCCH) related to the first reduced capability is distinguished from at least one LCID value for at least one CCCH related to the second reduced capability.

6. The method of claim 5, wherein:

a third message of the random access procedure includes a CCCH service data unit (SDU) and is transmitted on an uplink shared channel (UL-SCH).

7. The method of claim 1, wherein:

an initial uplink bandwidth part (BWP) used by both a terminal with the first reduced capability terminal and a terminal with the second reduced capability terminal is configured.

8. The method of claim 7, wherein:

at least one of the first message or a third message of the random access procedure is transmitted from the terminal to the network on the initial uplink BWP.

9. The method of claim 1, wherein:

an initial downlink BWP used by both a terminal with the first reduced capability terminal and a terminal with the second reduced capability terminal is configured.

10. The method of claim 9, wherein:

at least one of a second message or a fourth message of the random access procedure is transmitted from the network to the terminal on the initial downlink BWP.

11. The method of claim 1, wherein:

the information on the at least one feature combination, and the information on the at least one RA resource set associated with the at least one feature combination are included in a system information block (SIB).

12. The method of claim 1, wherein:

the RA resource set is a preamble set used in the random access procedure.

13. The method of claim 1, wherein:

a terminal having the first reduced capability is a terminal supporting a reduced bandwidth, or a terminal not supporting the reduced bandwidth.

14. The method of claim 13, wherein:

a maximum bandwidth for the terminal not supporting the reduced bandwidth is 20 MHz, the reduced bandwidth is less than 20 MHz.

15. The method of claim 1, wherein:

in the information on the at least one feature combination, the first reduced capability feature corresponds to an eRedCap field, the second reduced capability feature corresponds to a RedCap field.

16. A terminal in a wireless communication system, the terminal comprising:

at least one transceiver; and at least one processor connected to the at least one transceiver, wherein the at least one processor is configured to:

receive, through the at least one transceiver, from a network, information on at least one feature combination, and information on at least one random access (RA) resource set associated with the at least one feature combination; and based on one RA resource set of the at least one RA resource set, transmit, through the at least one transceiver, a first message of a random access procedure to the network, wherein based on a first feature combination being associated with a first RA resource set and a second feature combination being associated with a second RA resource set:

the first feature combination includes a first reduced capability feature, the second feature combination includes a second reduced capability feature, both the first reduced capability feature and the second reduced capability feature are not included in one feature combination.

17. A base station in a wireless communication system, the base station comprising:

at least one transceiver; and at least one processor connected to the at least one transceiver, wherein the at least one processor is configured to:

transmit, through the at least one transceiver, to at least one terminal, information on at least one feature combination, and information on at least one random access (RA) resource set associated with the at least one feature combination; and receive, through the at least one transceiver, from a terminal, a first message of a random access procedure transmitted based on one RA resource set of the at least one RA resource set, wherein based on a first feature combination being associated with a first RA resource set and a second feature combination being associated with a second RA resource set:

the first feature combination includes a first reduced capability feature, the second feature combination includes a second reduced capability feature, both the first reduced capability feature and the second reduced capability feature are not included in one feature combination.

* * * * *